(12) United States Patent
Kump

(10) Patent No.: US 6,300,005 B1
(45) Date of Patent: Oct. 9, 2001

(54) BATTERY WITH CONTAINER COMPARTMENT AND END WALL STIFFENING BLOCK

(75) Inventor: William H. Kump, St. Paul, MN (US)

(73) Assignee: GNB Technologies, Inc., Atlanta, GA (US)

( * ) Notice: Subject to any disclaimer, the term of this patent is extended or adjusted under 35 U.S.C. 154(b) by 0 days.

(21) Appl. No.: 09/270,726

(22) Filed: Mar. 17, 1999

(51) Int. Cl.⁷ .............................. H01M 2/04; H01M 2/02
(52) U.S. Cl. ........................ 429/175; 429/151; 429/176
(58) Field of Search .................................. 429/176, 175, 429/151

(56) References Cited

U.S. PATENT DOCUMENTS

| | | |
|---|---|---|
| D. 81,043 | 4/1930 | Sweet . |
| 598,926 | 2/1898 | Harris et al. . |
| 844,070 | 2/1907 | Weida et al. . |
| 915,328 | 3/1909 | Bentley . |
| 1,485,438 | 3/1924 | Spoeneman et al. . |
| 1,499,704 | 7/1924 | Stebbins . |
| 1,546,648 | 7/1925 | Glidden et al. . |
| 1,564,173 | 12/1925 | Ford et al. . |
| 1,635,976 | 7/1927 | Percy . |
| 2,045,950 | 6/1936 | Hottel ................... 136/166 |
| 2,141,791 | 12/1938 | Keller ....................... 206/2 |
| 2,148,510 | 2/1939 | Simison ................... 106/2 |
| 2,385,127 | 9/1945 | Carlile ................... 135/166 |
| 2,757,222 | 7/1956 | André ..................... 136/6 |
| 4,309,818 | 1/1982 | Kline ................... 29/623.1 |
| 4,336,314 | 6/1982 | Yonezu et al. ............ 429/66 |
| 4,460,663 | 7/1984 | Stutzbach et al. ......... 429/151 |
| 4,621,034 | 11/1986 | Kanda et al. ............. 429/59 |
| 4,634,642 | 1/1987 | Lopez-Doriga ........... 429/121 |
| 4,729,933 | 3/1988 | Oswald .................... 429/59 |
| 4,732,826 | 3/1988 | Hardigg ................. 429/176 |
| 4,942,963 | 7/1990 | Gibellini ................ 206/333 |
| 5,152,806 | 10/1992 | Piper et al. ............. 29/730 |
| 5,187,031 | 2/1993 | Heiman et al. .......... 429/129 |
| 5,209,991 | 5/1993 | Stocchiero .............. 429/66 |
| 5,212,025 | 5/1993 | Shibata et al. .......... 429/120 |
| 5,278,002 | 1/1994 | Hiers .................... 429/175 |
| 5,449,571 | 9/1995 | Longardner et al. ...... 429/120 |
| 5,492,779 | 2/1996 | Ronning ................. 429/120 |
| 5,624,770 | 4/1997 | Gummelt et al. ......... 429/143 |
| 5,626,982 | 5/1997 | Kawai et al. ............ 429/120 |

FOREIGN PATENT DOCUMENTS 2075174    10/1971    (FR) .

OTHER PUBLICATIONS

Patent Abstracts of Japan, vol. 008, No. 142 (Jul. 3, 1984) (JP59 051461 (Mar. 24, 1984)).

*Primary Examiner*—John S. Maples
(74) *Attorney, Agent, or Firm*—Leydig, Voit & Mayer, Ltd.

(57) ABSTRACT

A battery including a container, a cover and an end wall stiffener block. The container is molded with a compartment between an outer and an inner end wall into which the stiffener block is inserted. The stiffener block is preferably made of a stiff plastic or of metal. The stiffener block and compartment are sized so that a contacting relationship is maintained between the inner wall, the block, and the outer wall. The inner wall also maintains a contacting relationship with the active internal components of the battery. During assembly, both the inner and the outer end walls are heat-sealed to the cover, such that the compartment is entirely sealed.

20 Claims, 3 Drawing Sheets

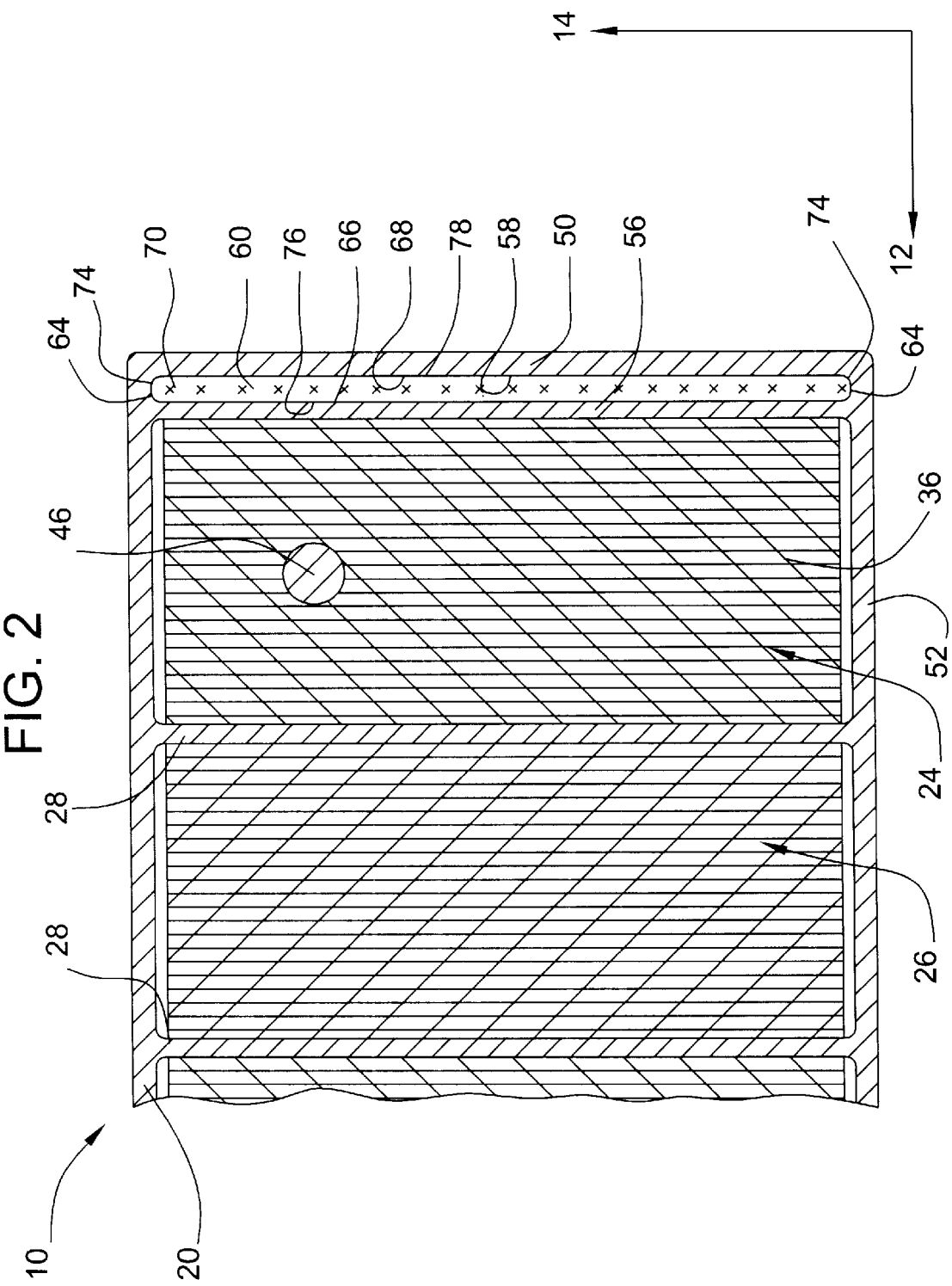

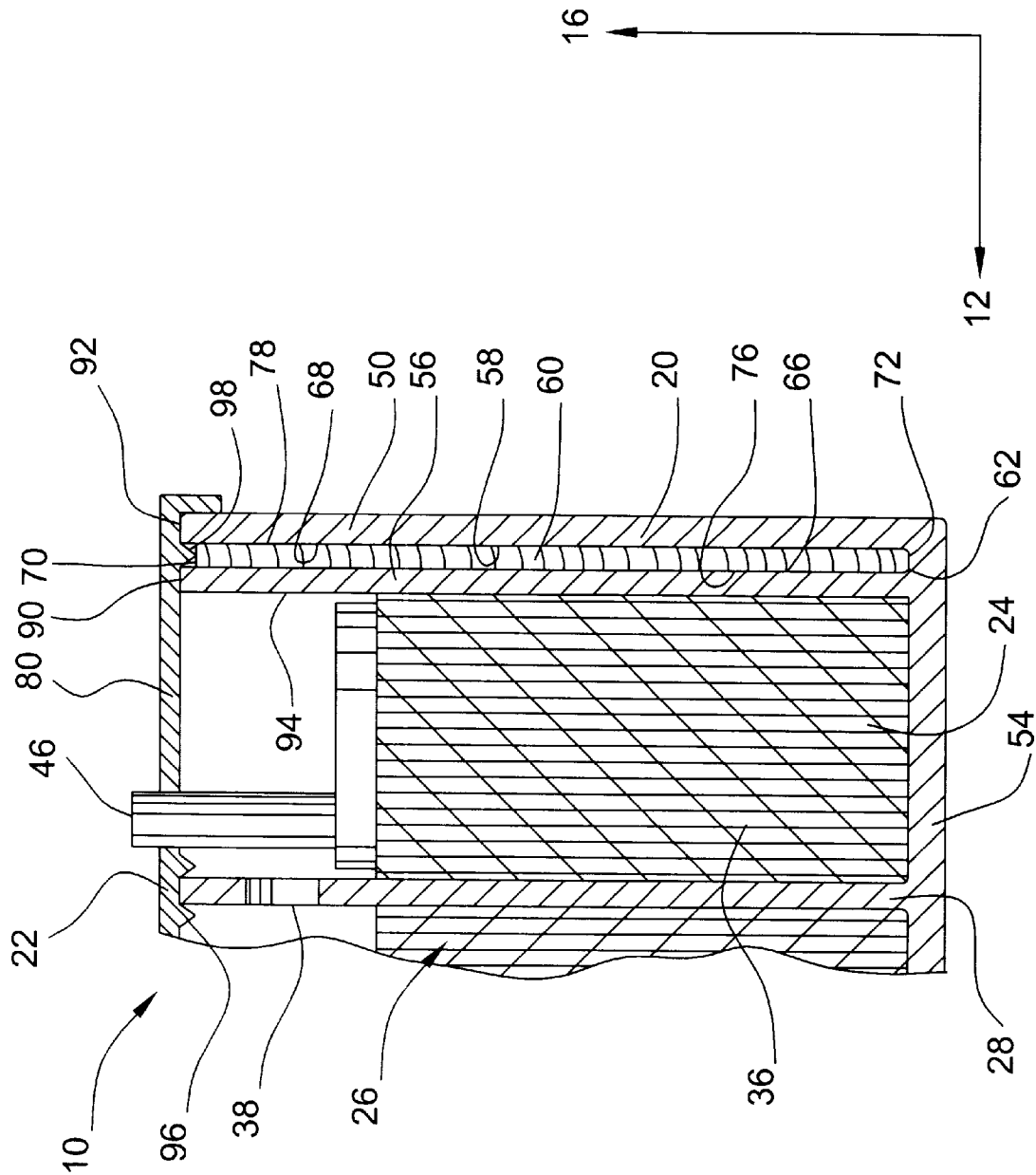

BATTERY WITH CONTAINER COMPARTMENT AND END WALL STIFFENING BLOCK

FIELD OF THE INVENTION

The invention relates to absorbed electrolyte batteries, and more particularly to a sealed battery adapted to withstand internal pressure variations with reduced end wall distortion while maintaining efficient battery operation.

BACKGROUND OF THE INVENTION

Absorbed electrolyte batteries are available in a variety of configurations. A well known example of such batteries is the sealed lead-acid type, although other types of absorbed electrolyte batteries are available, such as the nickel-cadmium configuration. Sealed lead-acid batteries, as an example of the type under consideration, typically have certain features in common. A common gas manifold system interconnects all cells and a venting device is normally provided to prevent excess gas pressure buildup within the battery. The battery elements are housed within a rectangular container which is divided by partition walls into a series of cells. An electrode stack is closely fitted within each cell. The electrode stacks comprise alternate positive and negative plates with separators interposed between the positive and negative plates.

In sealed lead-acid batteries, there is substantially no free unabsorbed electrolyte in the cells. The major portion of the electrolyte is restrained in the highly absorbent microfine glass fiber separator material between the positive and negative plates and within the pores of the positive and negative active material of the plates.

Although electrolyte is immobilized and absorbed in special separators, the separators are not fully saturated so that the gases evolved during charging or at other times can diffuse rapidly from one electrode to the other. Thus, in what is termed an "oxygen cycle," oxygen is produced at the positive electrode and diffuses to the negative electrode where it rapidly reacts to combine with active lead. Effectively, this reaction partially discharges the negative electrode, preventing the negative electrode from reaching its fully charged state, thereby minimizing the evolution of hydrogen. When the oxygen reacting at the negative electrode is equal to or greater than the rate of oxygen being produced at the positive electrode, water loss through electrolysis and, more importantly, pressure build up are minimized.

However, the oxygen cycle takes place only under the following conditions. First, both the positive and the negative plates must be in intimate contact with the separator material so that the entire surface of the plates has adequate electrolyte for its electrochemical requirements. Thus, it is of paramount importance that the cells be maintained under a compressive force to insure the necessary intimate contact between the plates and separators. Also, the oxygen initially produced at the positive plates must be contained in the cells under pressure (typically 0.5 to 8.0 psig) so that it contacts the negative plates to effect the oxygen cycle.

In conventional sealed lead-acid batteries, the distance between the partition walls corresponds to the thickness of the electrode stack such that the stack closely fits within the cell to achieve the desired compressive contact between the negative and positive electrode plates and the separators.

Unfortunately, the elevated internal pressures necessary to ensure the oxygen cycle occurs in combination with the additional increase in pressure from the resulting oxygen cycle, cause conventional containers to bulge, thus causing a relaxation of the compressive force in the end cells. Consequently, the intimate surface contact between the separators and positive and negative plates in the end cells is reduced causing battery efficiency to be significantly reduced.

Techniques used to prevent end wall bulging have taken many forms. For example, U.S. Pat. No. 5,187,031 discloses an anti-vibration plaque for insertion between each end cell and its corresponding end wall. The anti-vibration plaques are inserted into the battery container during manufacture and are designed to protect the end cell elements from the effects of vibration. Although this art may prevent end wall bulging in limited circumstances, it fails to fully reinforce the battery container end walls. Because the vibration plaque and end wall do not function unitarily, internal pressure may separate the plaque and end wall thus allowing the end wall to deform.

U.S. Pat. No. 4,729,933 discloses various batteries designed to maintain the element containing cells under compressive force by providing an auxiliary compressive means, at least a portion of which is spaced away from the end wall to form an auxiliary cell. Importantly, the pressure within the battery container as bounded by the end walls, i.e., the active cells and the auxiliary cells, is uniform. The '933 patent asserts that while the end walls may bulge, the auxiliary compression means maintains pressure on the active cells. By design, the '933 battery sacrifices the cosmetic appearance to maintain the function of the battery.

Other sealed lead-acid batteries presently being produced attempt to nullify bulging through the use of stiffer material less prone to bulge, stiffening ribs incorporated in the container end wall design, or thicker container end wall construction. Existing containers may also be molded with extremely thick end walls using a filled material to increase stiffness. Filled materials are more expensive than battery grade plastics. Furthermore, filled materials are typically more brittle than battery grade plastics and cause the battery container to be more susceptible to damage. Additionally, filled materials inhibit recycling because the filled material does not float in the recycling process and is, therefore, not readily separated from the polymeric material of the container.

Another approach involves inserts that are bonded and/or locked to the outside wall to prevent gas pressure between the wall and the stiffener to bulge the end wall. For example, batteries have included an insert molded with dovetails that match dovetails molded into the container end walls, as are disclosed in copending application Ser. No. 08/961,617, which is likewise assigned to the assignee of this application. Inserted stiffeners with dovetails must match the mating dovetails on the container requiring extremely close tolerances. Batteries incorporating such inserts on the inside surface, however, can still exhibit distortion due to the pressure build-up between the wall and the insert. Further, slip-in inserts located on the outside of the container trap acid and wash water. Batteries incorporating such inserts on the inside surface, however, can still exhibit distortion due to pressure build up between the wall and the insert.

While these approaches may offer some improvement, none of these techniques are entirely effective. For instance, thick and thin walls create very difficult molding parameters. Not only do such configurations increase battery manufacturing costs because material costs and molding cycle time are higher, but they also increase the weight of the batteries, another important consideration in battery design.

OBJECTS OF THE INVENTION

It is a primary object of the invention to provide a more effective and efficient means of reinforcing the end walls of a lead-acid battery. A more specific object is to provide a battery which facilitates efficient operation of the battery by maintaining compressive force within the active cells while providing good cosmetic battery appearance. A related object of the invention is to provide a means of reinforcing the end walls of a lead-acid battery that minimizes manufacturing and inventory costs.

It is a more specific object of the invention to provide an end wall stiffening block that is adjacent to the battery container to prevent end wall bulging.

It is a further object of the invention to provide a battery container that includes a stiffening block which is not susceptible to gas pressure build up between the battery container end wall and the stiffening block.

It is a related object of the invention to provide a battery container that minimizes the susceptibility of the stiffening block to deterioration due to acids and solvents found in environments where batteries are used.

It is a further object of the invention to provide a battery container that is readily recyclable.

It is another object of the invention to provide a battery container that is easier and less expensive to mold.

These and other objects and advantages of the invention will be apparent to those skilled in the art upon reading the following summary and detailed description and upon reference to the drawings.

SUMMARY OF THE INVENTION

In accomplishing these and other objects of the invention, there is provided a battery having a cover and a container. As in conventional batteries, the container is divided into cells by partition walls and holds the active internal components of the battery including stacks formed by positive and negative electrode plates and a separator material. In accordance with teachings of the invention, the container has inner and outer end walls, side walls, and a bottom. The active internal components are contained in at least one cell formed within the chamber bounded by the inner end walls, the side walls, and the bottom. The inner end wall and portions of the side walls and of the bottom, in conjunction with an outer end wall define a compartment. A stiffener block is inserted into each compartment. The stiffener block and compartment are preferably sized so that a contacting relationship is maintained between the inner end wall, the block, and the outer wall. Said inner wall maintains a contacting relationship with the internal active components of the battery.

Importantly, the cover is sealed to the container at the inner end wall, and side walls. In this way, gases and the like from the active components of the battery are separated from the stiffener block.

The cover is preferably heat-sealed to the compartment containing the stiffener block. As a result, the compartment and stiffener block are not susceptible tot he internal gas pressure within the battery cells, thereby minimizing or preventing separation of the stiffener block from the end walls and bulging of the outer end walls.

To reduce material costs, increase the ease of molding, and therefore, reduce molding time and cost, the inner and outer end walls are made from standard battery-grade plastic, rather than a filled material, and are similar in thickness. The stiffener block is made from a more rigid material, such as a stiff plastic or metal. Accordingly, the stiffener block may be readily separated from the container and the container may be readily recycled upon final disposal of the battery.

DESCRIPTION OF THE DRAWINGS

FIG. 2 is a fragmentary top plan view in section of the battery taken along line II—II in FIG. 1.

FIG. 3 is a fragmentary side elevational view in section of the battery taken along line III—III in FIG. 1.

DETAILED DESCRIPTION OF THE INVENTION

Figure 1:
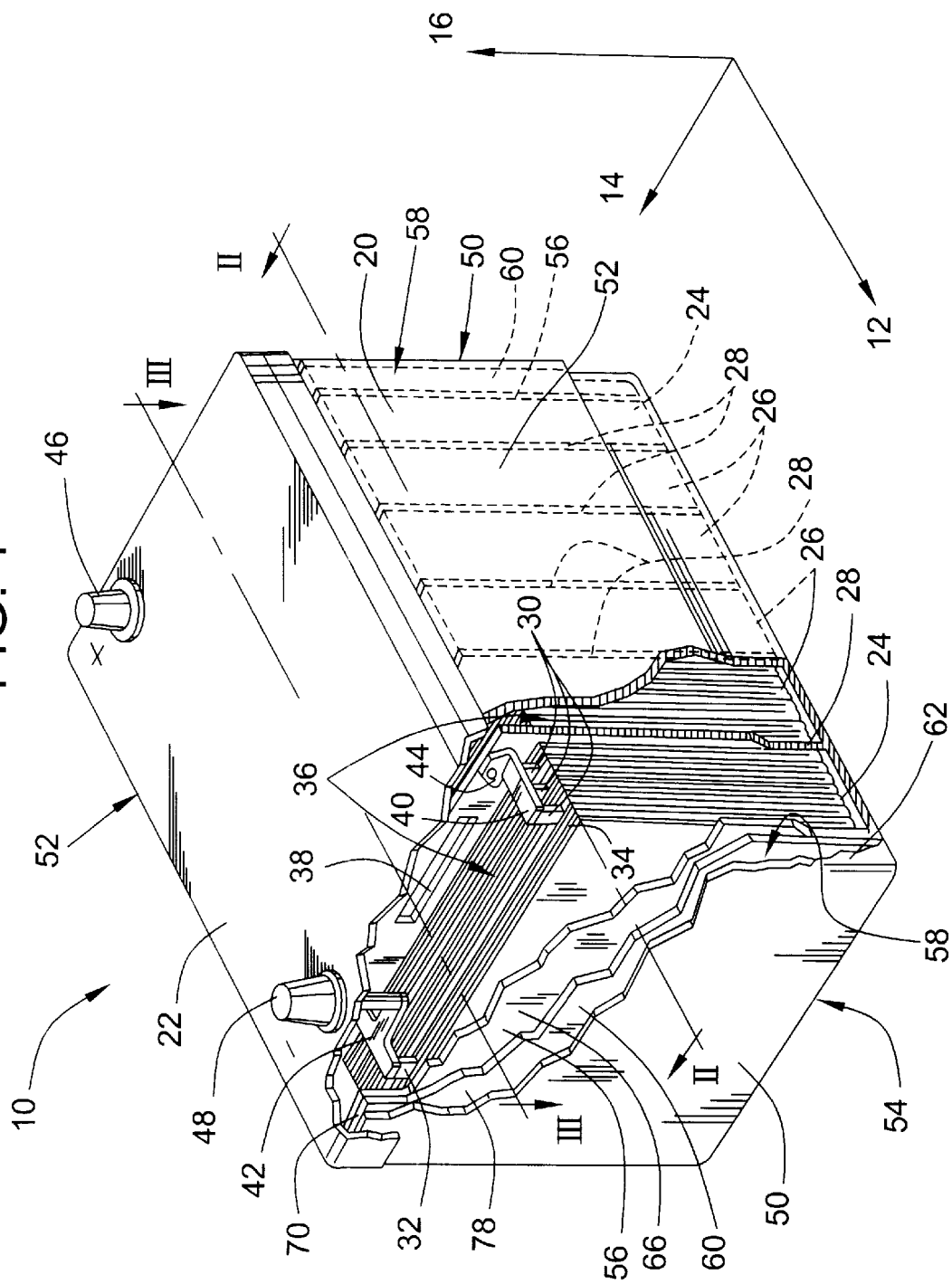
FIG. 1 is a perspective view of a battery comprising a container and a stiffening block constructed in accordance with teachings of the invention, partially cut away to show the internal configuration.

Turning now to the drawings, there is shown in FIG. 1, a battery 10 having a longitudinal X-axis 12, a transverse Y-axis 14 which is perpendicular to the X-axis 12, and a vertical Z-axis 16 which is perpendicular to the longitudinal X-axis 12 and to the transverse Y-axis 14. The thickness is taken along the X-axis 12. The width is taken along the Y-axis 14. And the height of a battery component is taken along the Z-axis 16.

The battery 10 includes a container 20 and a cover 22. The battery container 20 contains at least one cell and, in the illustrated embodiment, the container 20 contains six cells. It will be appreciated that the container may include greater or fewer cells. The container 20 is separated into end cells 24 and intermediate cells 26 by internal partition walls 28. Typically, each cell 24, 26 contains a plurality of positive electrode plates 30 and negative electrode plates 32 separated by absorbent separators 34 to form electrode stacks 36. The partition walls 28 have apertures 38 which allow gasses evolved in the stacks 36 to diffuse throughout the battery 10.

As shown in FIG. 1, in each cell 24, 26 a positive conductive strap 40 and a negative conducting strap 42 connect in parallel the positive electrode plates 30 and the negative electrode plates 32, respectively, within each cell 24, 26. The cells 24, 26 are connected in series by an inter-cell connection 44 between the conductive straps 40, 42, respectively. Each of the positive and negative conductive straps 40, 42 in both of the end cells 26 is a terminal conductive strap and is electrically connected to a positive battery terminal 46 and a negative battery terminal 48, respectively.

Typically, in sealed lead-acid batteries, electrolyte is contained within the porous electrode plates 30, 32 and the absorbent separators 34. Because the gasses that are formed during battery charging and operation must be able to diffuse quickly from one electrode to the other, the absorbent separators 34 are not fully saturated with electrolyte. During operation, the oxygen evolved at the positive electrode plates 30 diffuses to the negative electrode plates 32 to rapidly react with the active material. This oxygen cycle, in turn, partially discharges the negative plates 32 and prevents the plates 32 from reaching a fully charged state. The oxygen cycle minimizes the evolution of hydrogen at the negative plates 32 and the loss of water through electrolysis, thereby minimizing pressure buildup within the battery 10.

The oxygen cycle, however, will operate properly only if there is a compressive force on the electrode stacks 36 sufficient to maintain contact between the electrode plates 30, 32 and the absorbent separators 34 such that the plates 30, 32 receive adequate electrolyte from the separators 34 to meet the desired electrochemical requirements. Furthermore, the battery 10 must operate at an elevated pressure (typically 0.5 to 8 psig) within the container 20 so that the oxygen produced by the positive electrode plates 30 diffuses to the negative electrode plates 32.

The container 20 houses the internal components of the battery 10 and includes: outer end walls 50, side walls 52, and a bottom 54. In the past, the elevated internal pressures in combination with the additional pressure buildup due to the oxygen cycle have caused the end walls 50 to bulge. End wall bulging releases the compressive forces on the electrode stack 36 causing separation of the electrode plates 30, 32 from the absorbent separators 34, thus significantly reducing battery life and efficiency.

In accordance with the invention. the battery 10 avoids the effects of end wall bulging by adapting the container 20 to also include inner end walls 56. Compartments 58 are formed by the outer end walls 50, the inner end walls 56, and portions of the side walls 52 and of the bottom 54. In order to increase resistance to distortion in the end walls 50, 56 such that pressure will be maintained on the stack 36, an end wall stiffener block 60 is inserted into each compartment 58.

The compartment 58 has a bottom surface 62, side surfaces 64 (FIG. 2), an inner end wall surface 66, and an outer end wall surface 68. The stiffener block 60 has a top surface 70 (FIG. 3), a bottom surface 72 (FIG. 3), side surfaces 74 (FIG. 2), an inner end wall surface 76, and an outer end wall surface 78. The stiffener block 60 can be a stiff plastic, such as polypropylene filled with glass or ryton, or of metal. The stiffener block 60 has an overall height and width substantially corresponding to the respective height and width of the end walls 50, 56.

To achieve the desired rigidity for the stiffener block 60, the thickness and/or material of the stiffener block 60 is controlled. For instance, for the same desired rigidity, a stiffener block 60 made from metal will not need to be as thick as a stiffener block 60 made of plastic. On the other hand, a stiffener block 60 of metal that is one inch thick will be more rigid than a block 60 of metal that is one-half inch thick. In a preferred embodiment, the stiffener block 60 would be either 0.2 inches thick if made from a stiff plastic or 0.06 inches thick if made from metal.

For the compartment and stiffener block to prevent internal battery pressure from bulging the outer end wall, the thickness of the compartments 58 will be sized so that the block 60 will fit into the compartment 58 and contact both the inner end wall and the outer end wall. Therefore, the thickness of the compartment 58 will depend on the material selected for the block 60 and on the rigidity desired of the stiffener block 60.

In order to minimize the affect of changes in pressure within the battery 10 due to its active components, the pressure within the compartment 58 is not in equilibrium with the pressure within the cells 24, 26. Thus, in accordance with an important aspect of the invention, the upper edge 90 of the inner end wall 56 is sealed to the battery cover 22 such that the active battery components are sealed off from the compartment 58. It will be appreciated by those skilled in the art, that, as a result, the gases from within the battery cells 24, 26 do not seep between the surfaces 76, 78 of the stiffener block 60 and the surfaces 66, 68 of the compartment 58 to cause separation of the same and the concomitant distortion.

According to another feature of the invention, the compartment 58 is likewise sealed. The upper surface 70 of the compartment 58 is preferably formed by a portion of the cover 22. In this way, during assembly, the stiffener block 60 may be inserted into the compartment 58, and then the cover 22 may be preferably heat-sealed to the side walls 52, the partitions 28, the outer end wall 50, and the inner end wall 56 in a single heat-sealing operation. While the cover 22 has been described as preferably a unitary cover which is sealed to both the cells 24, 26 and the compartment 58, it will be appreciated that the upper surface 70 of the compartment 58 may alternately be formed by a separate compartment cover which is sealed to the inner and outer end walls 56, 50, and the side walls 52. Sealing the compartments 58 that house the stiffener blocks 60 not only prevents bulge between the stiffener blocks and the outer end walls, but prevents acid or wash water/acid from entering the compartments, and thereby prevents acid from destroying the stiffener blocks.

To facilitate location of the cover 22 on the container 20 and to facilitate such heat sealing, locating ridges 96, 98 maybe provided along the inner surface of the cover 22. It will be appreciated that the ridges 96 also assist in maintaining the partitions 28 in position during operation, while the ridges 98 maintain the inner end wall 56 in position, further inhibiting nay breakage of the heat seal between the inner end wall 56 and the cover.

FIGS. 2 and 3 show the stiffener block 60 in its functional position, that is, inserted into the compartment 58. The inner end wall surface 76 of the block 60 is in contact with the inner end wall surface 66 of the compartment 58, and the outer end wall surface 78 is in contact with the outer end wall surface 68. Referring to FIG. 3, the top surface 70 of the stiffening block 60 is preferably substantially subjacent a top surface 80 of the container 20 or a ridge 98 of the cover 22. The bottom surface 72 of the stiffener block 60 rests on or is in close proximity with the bottom surface 62 of the compartment 58. And referring to FIG. 2, the side surfaces 74 of the block 60 contact or are in close proximity with the side surfaces 64 of the compartment 58. Referring to FIG. 3, a cell surface 94 of the inner wall 56 is used as a cell wall for the end cell 24. Accordingly, the inner wall 56 is placed in compressive contacting relation to the stack 36 in the end cell 24.

In order for the container 20 to be recyclable and to be produced with reduced material costs, preferably, the container 20 is made from a standard battery-grade plastic and does not require a filled material, although it may be made from a filled, and non-battery grade plastic. During the recycling process, the stiffener block 60 may be removed from the container 22 prior to recycling the container 22 itself. More expensive filled material, as used in prior art designs, are less readily recycled because the filling does not float in the recycling process and is, therefore, not easily separated.

In order for the container 20 to be produced with reduced molding time and simplified molding parameters, the inner end walls 56 and the outer end walls 50 may advantageously be sized so that the thickness of each of the walls 56, 50 is similar. A preferred embodiment of the container 20 has inner end walls 56 with a thickness of 0.060 inches and outer end walls 50 with a thickness of 0.080 inches.

While this invention has been described with an emphasis upon preferred embodiments, it will be obvious to those of ordinary skill in the art that variations of the preferred embodiments may be used and that it is intended that the invention may be practiced otherwise than as specifically described herein. Accordingly, this invention includes all modifications, alternative constructions, and equivalents encompassed within the spirit and the scope of the invention.

Additionally, the particular configuration and type of battery discussed above is not a part of this invention. Many configurations are known and may be used. Similarly, the specific components that are used in the battery, other than the components associated with the battery container and stiffening block, do not form a part of this invention. Rather, the present invention may be used with any battery that operates under an internal pressure.

I claim as my invention:

1. An electric storage battery comprising:

active ingredients, a battery cover, a container, said container comprising sidewalls each having an upper edge and a lower end, an outer end wall disposed between said sidewalls, said outer end wall having an upper edge and a lower end, an inner end wall disposed in spaced relation to said outer end wall between said sidewalls, said inner end wall having an upper edge and a lower end, the inner end wall and the side walls forming at least one cell, said cell containing the active ingredients of the battery, said battery cover being sealed to at least a portion of the upper edges of the side walls and the upper edge of the inner end wall, a container bottom disposed in sealing relation to the lower ends of the sidewalls and the lower end of the inner end wall, a compartment bottom disposed in sealing relation to the lower end of the inner end wall, the lower end of the outer end wall, and the lower ends of the side walls between the inner and outer end walls, a compartment cover being sealed to the container along the upper edge of the inner end wall, the upper edge of the outer end wall, and at least a portion of the upper edges of the side walls such that the compartment bottom, the compartment cover, the inner end wall, the outer end wall, and the side walls form a compartment, the compartment cover comprising a lower surface having a location ridge, and a stiffener block, said stiffener block being disposed in the compartment, said stiffener block being dimensioned so that the inner end wall and the outer end wall both are placed in contacting relation with the stiffener block whereby the stiffener minimizes bowing of the inner end wall due to operation of the battery.

2. The electric storage battery of claim 1 wherein the stiffener block comprises ryton.

3. The electric storage battery of claim 1 wherein the stiffener block comprises metal.

4. The electric storage battery of claim 1 wherein the stiffener block comprises a filled polymeric material.

5. The electric storage battery of claim 1 wherein the compartment cover and the battery cover are a single cover.

6. The electric storage battery of claim 5, wherein the single cover is heat-sealed to the battery container.

7. The electric storage battery of claim 1 wherein the compartment cover is heat-sealed to the battery container.

8. The electric storage battery of claim 1 wherein the container is unitarily molded.

9. The electric storage battery of claim 8 wherein the compartment cover and the battery cover are a single cover.

10. The electric storage battery of claim 9 wherein the single cover is heat-sealed to the battery container.

11. The electric storage battery of claim 8 wherein the compartment cover is heat-sealed to the battery container.

12. The electric storage battery of claim 1 wherein the battery container is recyclable.

13. The electric storage battery of claim 5 wherein the battery container is recyclable.

14. The electric storage battery of claim 6 wherein the battery container is recyclable.

15. The electric storage battery of claim 7 wherein the battery container is recyclable.

16. The electric storage battery of claim 1 wherein the inner end wall and the outer end wall are substantially the same thickness.

17. The electric storage battery of claim 5 wherein the inner end wall and the outer end wall are substantially the same thickness.

18. The electric storage battery of claim 6 wherein the inner end wall and the outer end wall are substantially the same thickness.

19. The electric storage battery of claim 12 wherein the inner end wall and the outer end wall are substantially the same thickness.

20. The electric storage battery of claim 1 wherein the container is unitarily molded.

* * * * *